(12) United States Patent
Landy et al.

(10) Patent No.: US 12,248,606 B2
(45) Date of Patent: Mar. 11, 2025

(54) SYSTEMS, METHODS, AND APPARATUSES FOR IDENTIFYING UNAUTHORIZED USE OF A USER'S AUTHENTICATION CREDENTIALS TO AN ELECTRONIC NETWORK BASED ON NON-PUBLIC DATA ACCESS

(71) Applicant: BANK OF AMERICA CORPORATION, Charlotte, NC (US)

(72) Inventors: Marci Anne Landy, Waxhaw, NC (US); Daniel Joseph Serna, The Colony, TX (US); Tina Berumen Pachorek, Centennial, CO (US); Jessica Hope Thompson, Grapevine, TX (US); Joseph Henry Pindell, Jr., Euless, TX (US); Mrunal Mody, Keller, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 178 days.

(21) Appl. No.: 17/944,746

(22) Filed: Sep. 14, 2022

(65) Prior Publication Data
US 2024/0086569 A1   Mar. 14, 2024

(51) Int. Cl.
G06F 21/62   (2013.01)
G06F 21/60   (2013.01)

(52) U.S. Cl.
CPC ........ *G06F 21/6245* (2013.01); *G06F 21/604* (2013.01); *G06F 2221/2101* (2013.01); *G06F 2221/2115* (2013.01)

(58) Field of Classification Search
CPC .................................................. G06F 21/6245
See application file for complete search history.

(56) References Cited

U.S. PATENT DOCUMENTS 6,073,242 A   6/2000 Hardy
7,929,535 B2   4/2011 Chen
(Continued)

FOREIGN PATENT DOCUMENTS

EP   1762076 A2   3/2007
EP   3151505 A1   4/2017
(Continued)

OTHER PUBLICATIONS

James A. Muir; Internet Geolocation: Evasion and Counterevasion; ACM: 2009; pp. 1-23.

*Primary Examiner* — Ponnoreay Pich
(74) *Attorney, Agent, or Firm* — Moore & Van Allen PLLC; Lauren M. Stokes

(57) ABSTRACT

Systems, computer program products, and methods are described herein for identifying unauthorized use of a user's authentication credentials to an electronic network based on non-public data access. The present invention is configured to receive a verified access attempt at a first time for a user account; receive an unverified access attempt at a second time for the user account; determine the unverified access attempt is a credential sharing event for the user account; determine the user account is an internal account; determine an unverified user associated with the unverified access attempt is an external user; receive unverified account access logs associated with the unverified access attempt, the unverified account access logs comprising access to non-public data; and generate an unverified data access interface component to configure a graphical user interface of a device associated with a manager of the system.

20 Claims, 7 Drawing Sheets

(56) References Cited

U.S. PATENT DOCUMENTS

| | | | |
|---|---|---|---|
| 7,984,064 B2* | 7/2011 | Fusari | G06F 21/35 |
| | | | 707/770 |
| 8,006,288 B2 | 8/2011 | Camenisch | |
| 8,051,052 B2 | 11/2011 | Jogand-Coulomb | |
| 8,086,508 B2 | 12/2011 | Dheer | |
| 8,146,142 B2 | 3/2012 | Lortz | |
| 8,364,969 B2* | 1/2013 | King | G06F 21/6245 |
| | | | 713/182 |
| 8,374,634 B2 | 2/2013 | Dankar | |
| 8,504,849 B2 | 8/2013 | Jogand-Coulomb | |
| 8,869,244 B1 | 10/2014 | Sundaram | |
| 9,178,894 B2 | 11/2015 | Michael | |
| 9,397,990 B1 | 7/2016 | Taly | |
| 9,848,001 B2 | 12/2017 | Kim | |
| 10,021,108 B2 | 7/2018 | Mankovskii | |
| 10,057,269 B1 | 8/2018 | Ellingson | |
| 10,692,321 B2 | 6/2020 | Campero | |
| 10,735,202 B2 | 8/2020 | Jayachandran | |
| 11,012,861 B1 | 5/2021 | Lippert | |
| 11,055,802 B2 | 7/2021 | Jarvis | |
| 2005/0010780 A1* | 1/2005 | Kane | G06F 21/6245 |
| | | | 713/193 |
| 2006/0064758 A1* | 3/2006 | Petner | G06F 21/16 |
| | | | 726/26 |
| 2006/0173810 A1* | 8/2006 | Hom | G06F 21/6218 |
| 2011/0023107 A1 | 1/2011 | Chen | |
| 2011/0191838 A1* | 8/2011 | Yanagihara | G06F 21/00 |
| | | | 726/26 |
| 2013/0160141 A1* | 6/2013 | Tseng | H04W 4/21 |
| | | | 726/28 |
| 2015/0120572 A1 | 4/2015 | Slade | |
| 2015/0227934 A1 | 8/2015 | Chauhan | |
| 2016/0364553 A1 | 12/2016 | Smith | |
| 2016/0366183 A1 | 12/2016 | Smith | |
| 2021/0304540 A1 | 9/2021 | Lundberg | |
| 2024/0086569 A1* | 3/2024 | Landy | G06F 21/604 |

FOREIGN PATENT DOCUMENTS

| | | |
|---|---|---|
| ES | 2701613 T3 | 2/2019 |
| JP | 5698539 B2 | 4/2015 |
| JP | 2016535902 A | 11/2016 |
| KR | 102308846 B1 | 10/2021 |

* cited by examiner

SYSTEMS, METHODS, AND APPARATUSES FOR IDENTIFYING UNAUTHORIZED USE OF A USER'S AUTHENTICATION CREDENTIALS TO AN ELECTRONIC NETWORK BASED ON NON-PUBLIC DATA ACCESS

FIELD OF THE INVENTION

The present invention embraces a system for identifying unauthorized use of a user's authentication credentials to an electronic network based on non-public data access.

BACKGROUND

Users in electronic networks have a harder time than ever before making sure their authentication credentials remain secure and any data within their user accounts remain private (e.g., data that may be accessed within the user account and/or data that may be accessed within applications the user account has access to). Such data within the user account and/or within applications the user account may have access to may comprise non-public data—personally identifiable information—that may be detrimental to the user themselves or to other individuals if misappropriated by a bad actor. A need, therefore, exists for high security protocols that prevent the unauthorized use of user's authentication credentials by an unverified user (e.g., a user that is not the real user of the user account) who may gain access to non-public data. However, there also exists a need to not unduly burden a user of the account where the user's account does not have access to non-public data and where the unverified user (e.g., the user that is not the real user of the account) is a trusted third party of the real user and was given the authentication credentials intentionally.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for identifying unauthorized use of a user's authentication credentials is provided. The system may comprise: a memory device with computer-readable program code stored thereon; at least one processing device operatively coupled to the at least one memory device and the at least one communication device, wherein executing the computer-readable code is configured to cause the at least one processing device to: receive a verified access attempt at a first time for a user account; receive an unverified access attempt at a second time for the user account; determine the unverified access attempt is a credential sharing event for the user account, wherein the credential sharing event comprises a sharing of user credentials associated with the user account to an unverified user; determine the user account is an internal account; determine an unverified user associated with the unverified access attempt is an external user; receive unverified account access logs associated with the unverified access attempt, the unverified account access logs comprising access to non-public data; and generate an unverified data access interface component to configure a graphical user interface of a device associated with a manager of the system.

In some embodiments, the processing device is further configured to: apply a threat level machine learning model to a user account identifier associated with the user account; and determine, by the threat level machine learning model, a threat level indication of the user account, wherein the threat level indication comprises a high threat level where the user account has access to a non-public data. In some embodiments, the processing device is further configured to automatically deny, in response to determining the high threat level indication of the user account, the unverified access attempt to the account. In some embodiments, the processing device is further configured to generate, in response to determining the high threat level indication of the user account, a high threat level interface component to configure a graphical user interface of a device associated with the manager of the system. In some embodiments, the processing device is further configured to: collect a set of application logs associated with the account identifier, the set of application logs comprising a plurality of previous applications accessed by the user account associated with the account identifier; create a first training set comprising the collected set of application logs; and train the threat level machine learning model in a first stage using the first training set. In some embodiments, the collected set of application logs may comprise non-public data.

In some embodiments, the internal account is an account associated with an internal user associated with the manager of the system. In some embodiments, the processing device is further configured to generate, wherein the external user is a user associated with the manager of the system and the internal account is an account associated with an internal user associated with the manager of the system, a credential sharing indication interface component to configure a graphical user interface of a device associated with the manager of the system.

In some embodiments, the external user associated with the unverified access attempt is a user that is not associated with the manager of the system.

In some embodiments, the external user associated with the unverified access attempt is a user associated with the manager of the system.

In some embodiments, the second time associated with the unverified access attempt is at a later time than the first access attempt associated with the verified access attempt.

In another aspect, a computer program product for identifying unauthorized use of a user's authentication credentials is provided. The computer program product may comprise at least one non-transitory computer-readable medium having computer-readable program code portions embodied therein, the computer-readable program code portions which when executed by a processing device are configured to cause the processor to: receive a verified access attempt at a first time for a user account; receive an unverified access attempt at a second time for the user account; determine the unverified access attempt is a credential sharing event for the user account, wherein the credential sharing event comprises a sharing of user credentials associated with the user account to an unverified user; determine the user account is an internal account; determine an unverified user associated with the unverified access attempt is an external user; receive unverified account access logs associated with the unverified access attempt, the unverified account access logs comprising access to non-public data; and generate a unverified data access interface component to configure a graphical user interface of a device associated with a manager of the system.

In some embodiments, the processing device processing device is further configured to cause the processor to: apply a threat level machine learning model to a user account identifier associated with the user account; and determine, by the threat level machine learning model, a threat level indication of the user account, wherein the threat level indication comprises a high threat level where the user account has access to a non-public data. In some embodiments, the processing device is further configured to automatically deny, in response to determining the high threat level indication of the user account, the unverified access attempt to the account. In some embodiments, the processing device is further configured to generate, in response to determining the high threat level indication of the user account, a high threat level interface component to configure a graphical user interface of a device associated with the manager of the system.

In some embodiments, the internal account is an account associated with an internal user associated with the manager of the system.

In some embodiments, the external user associated with the unverified access attempt is a user that is not associated with the manager of the system.

In some embodiments, the external user associated with the unverified access attempt is a user associated with the manager of the system. In some embodiments, the processing device is further configured to generate, wherein the external user is a user associated with the manager of the system and the internal account is an account associated with an internal user associated with the manager of the system, a credential sharing indication interface component to configure a graphical user interface of a device associated with the manager of the system.

In another aspect, a computer-implemented method for identifying unauthorized use of a user's authentication credentials is provided. The computer-implemented method may comprise: receiving a verified access attempt at a first time for a user account; receiving an unverified access attempt at a second time for the user account; determining the unverified access attempt is a credential sharing event for the user account, wherein the credential sharing event comprises a sharing of user credentials associated with the user account to an unverified user; determining the user account is an internal account; determining an unverified user associated with the unverified access attempt is an external user; receiving unverified account access logs associated with the unverified access attempt, the unverified account access logs comprising access to non-public data; and generating a unverified data access interface component to configure a graphical user interface of a device associated with a manager of the system.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
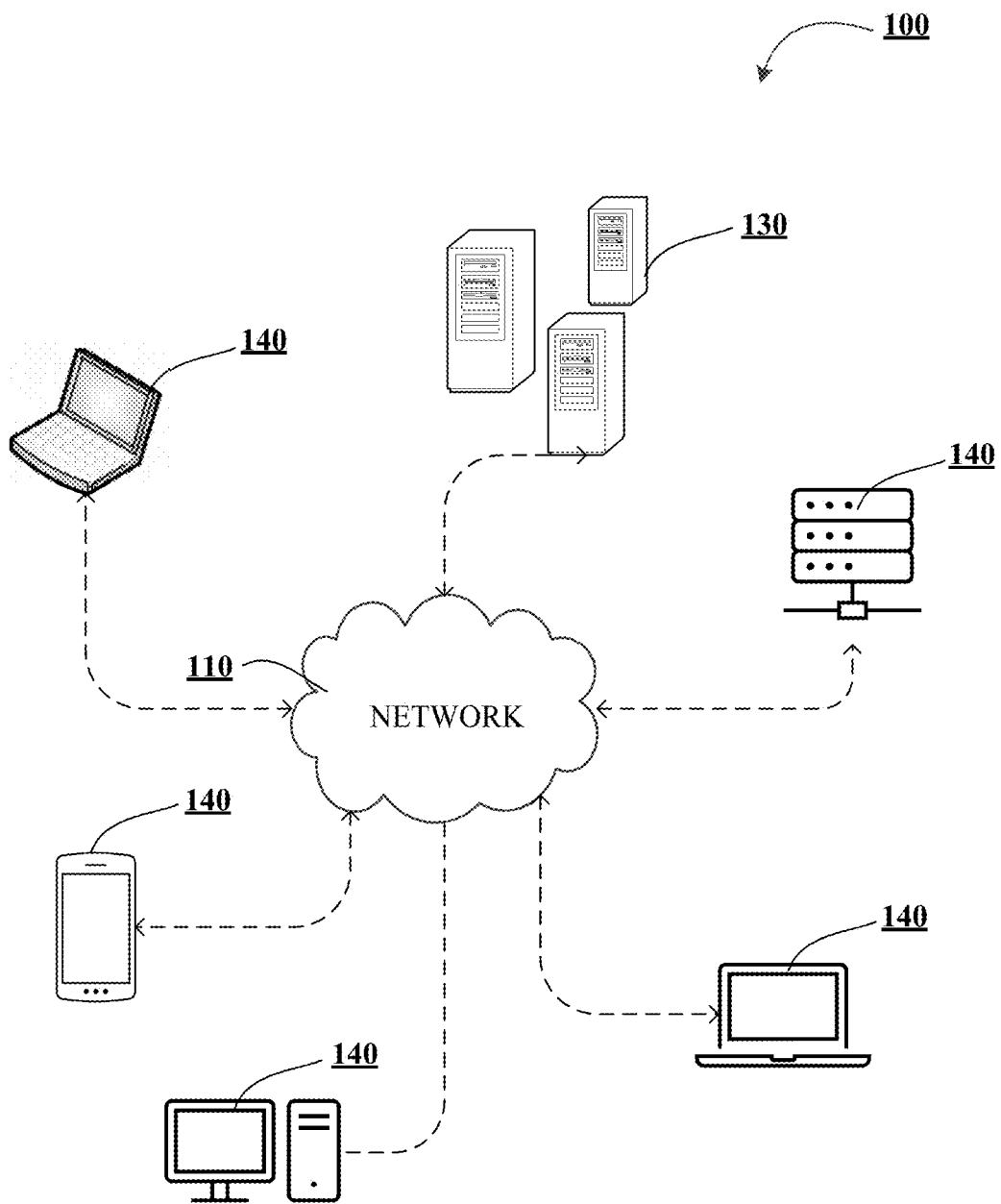
Figure 1B:
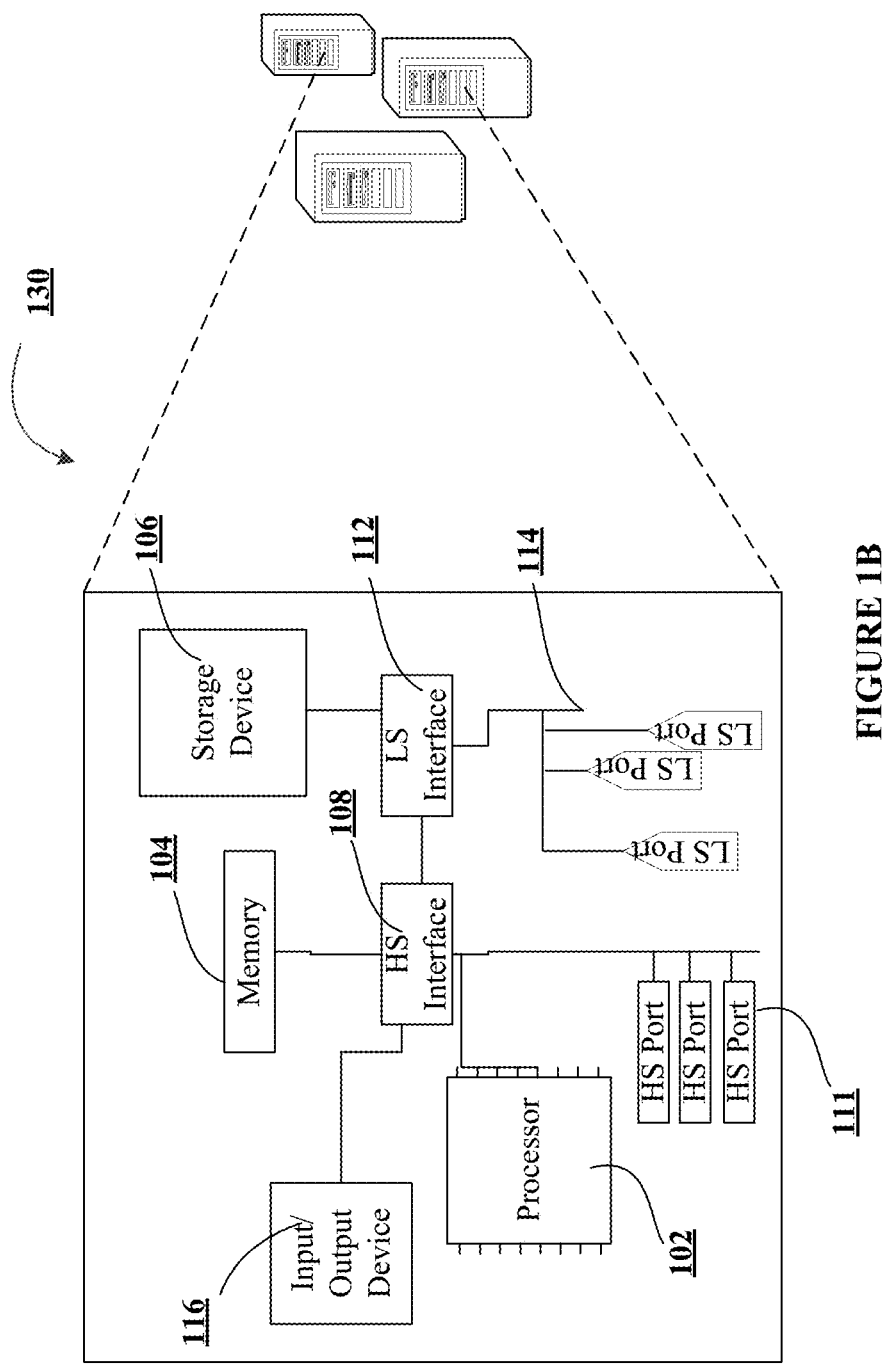
Figure 1C:
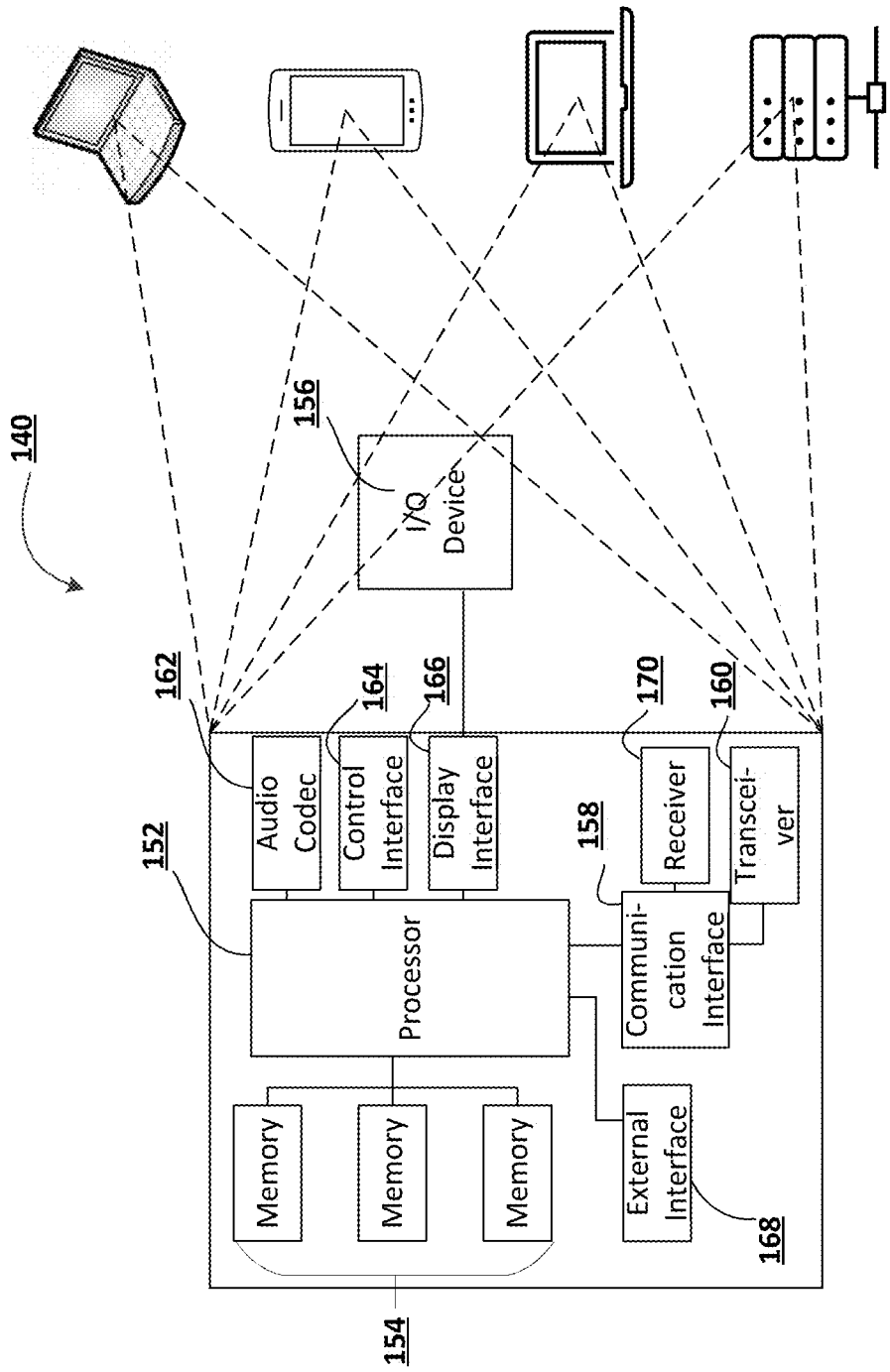
Figure 2:
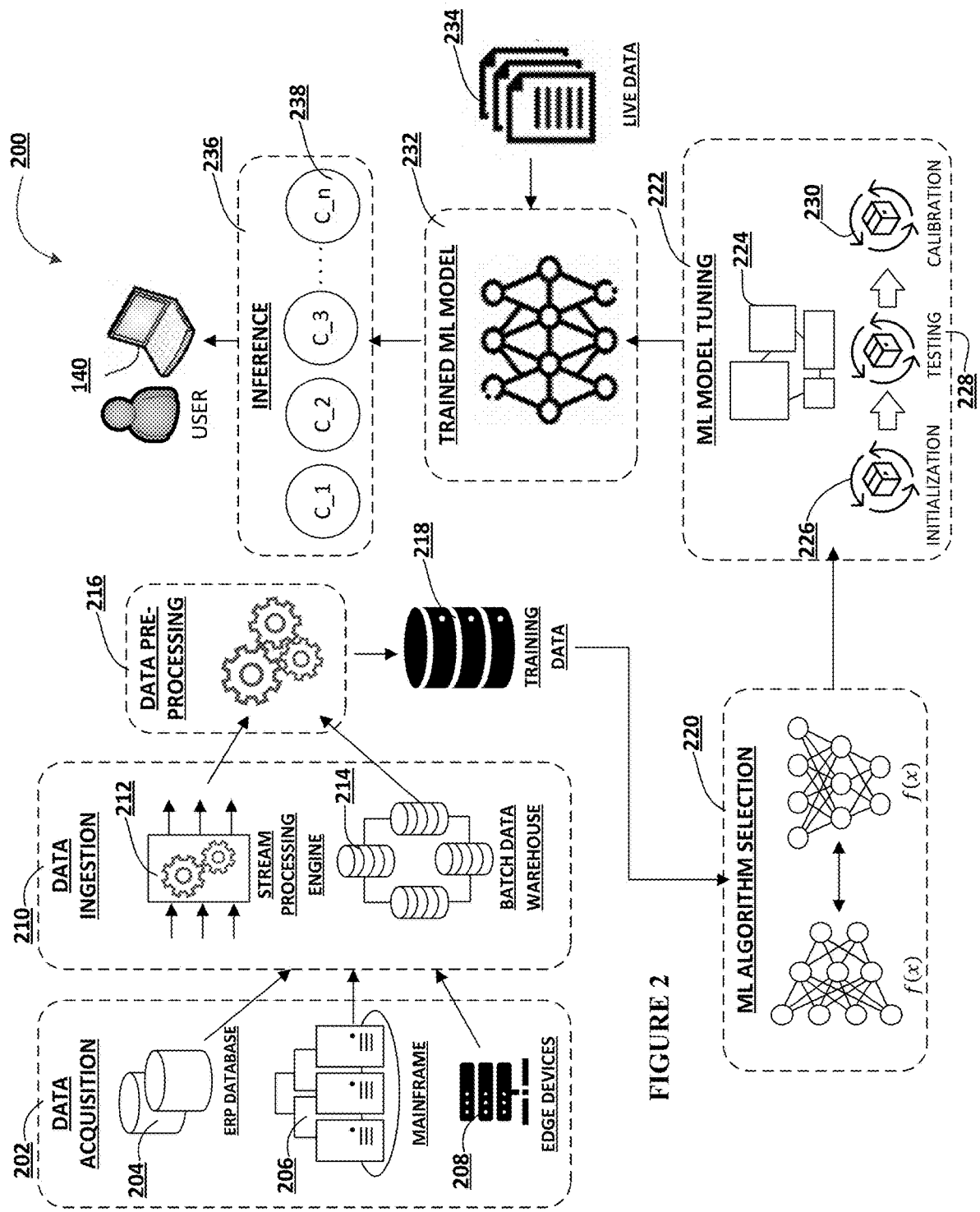
Figure 3:
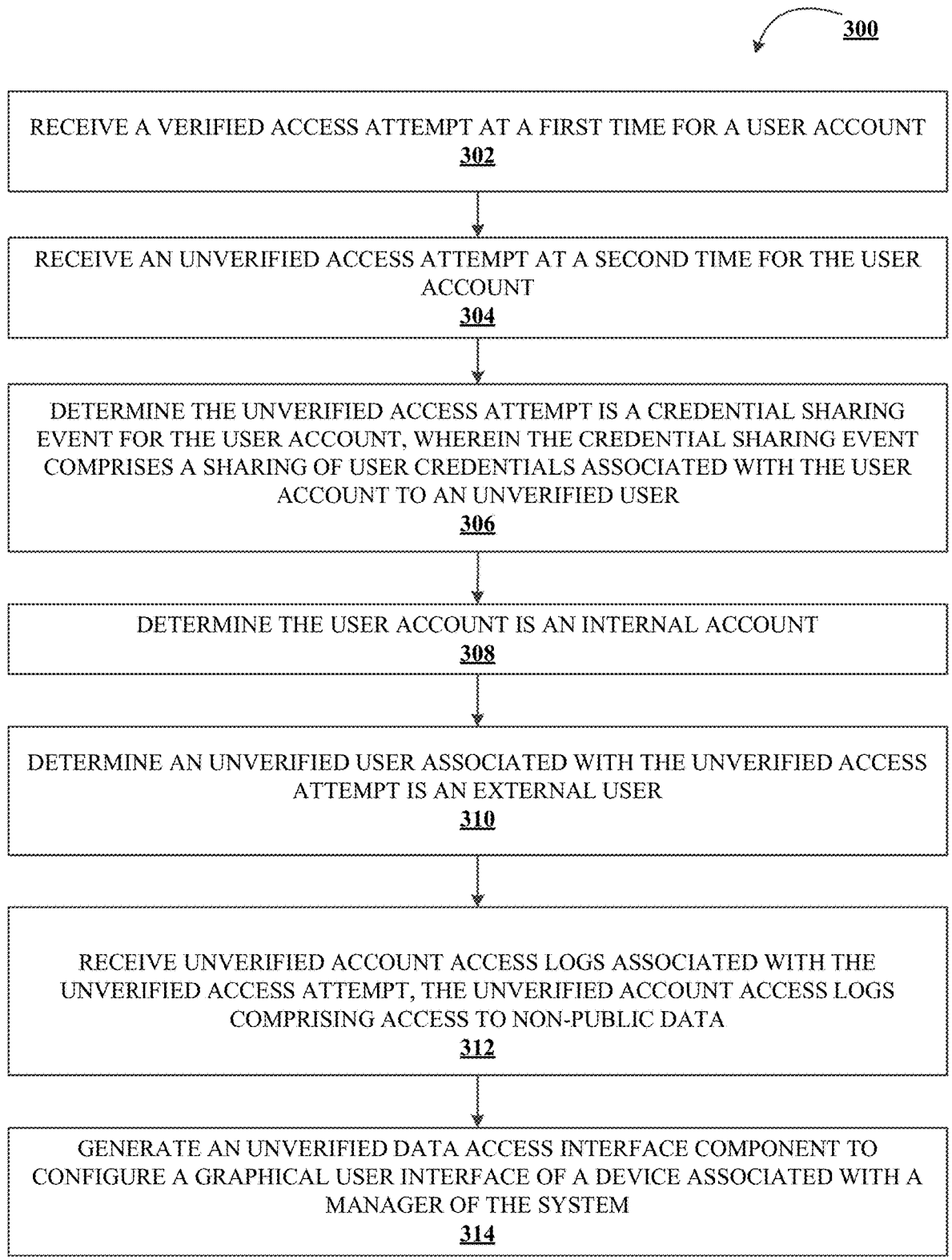
Figure 4:
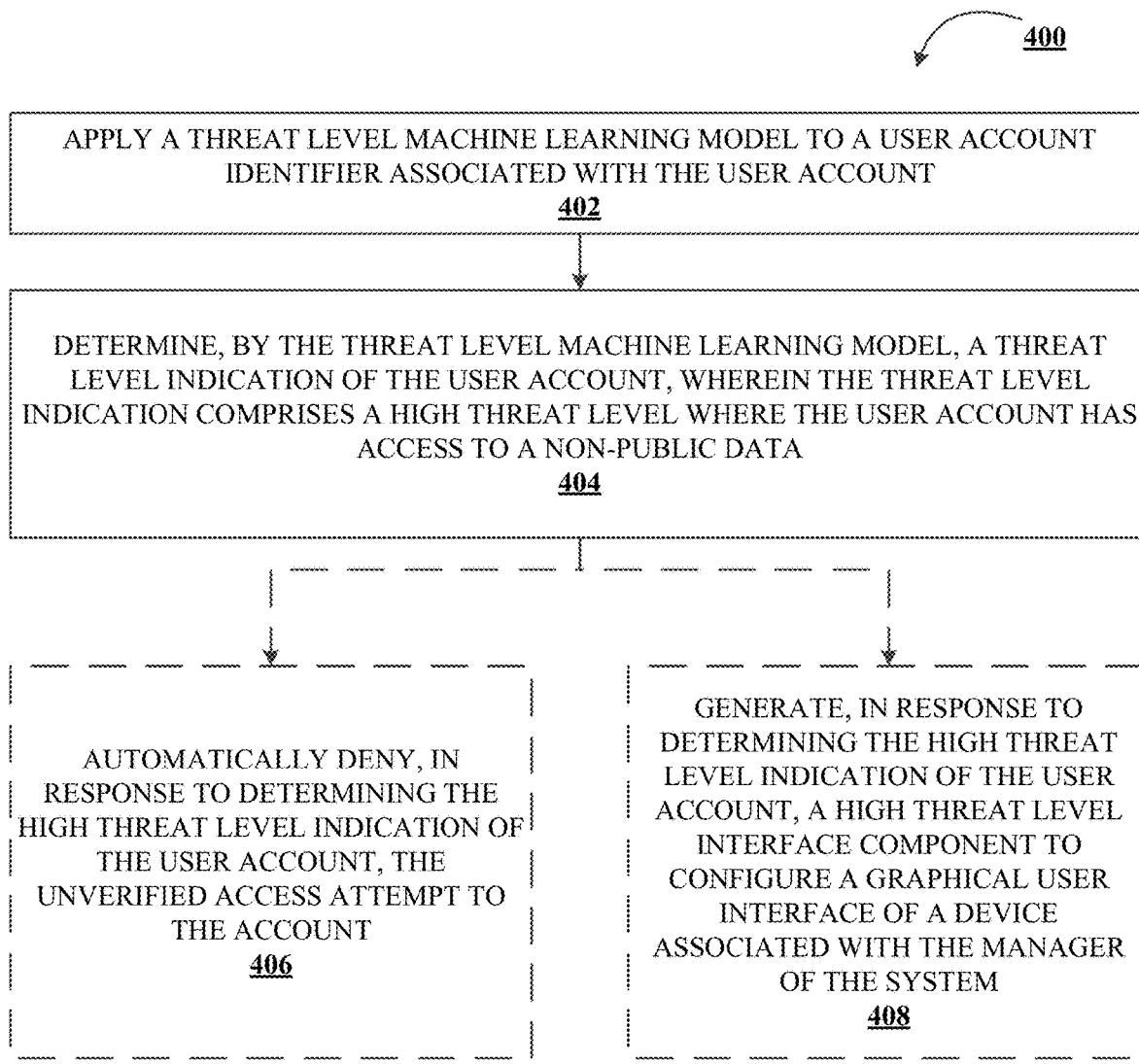
Figure 5:
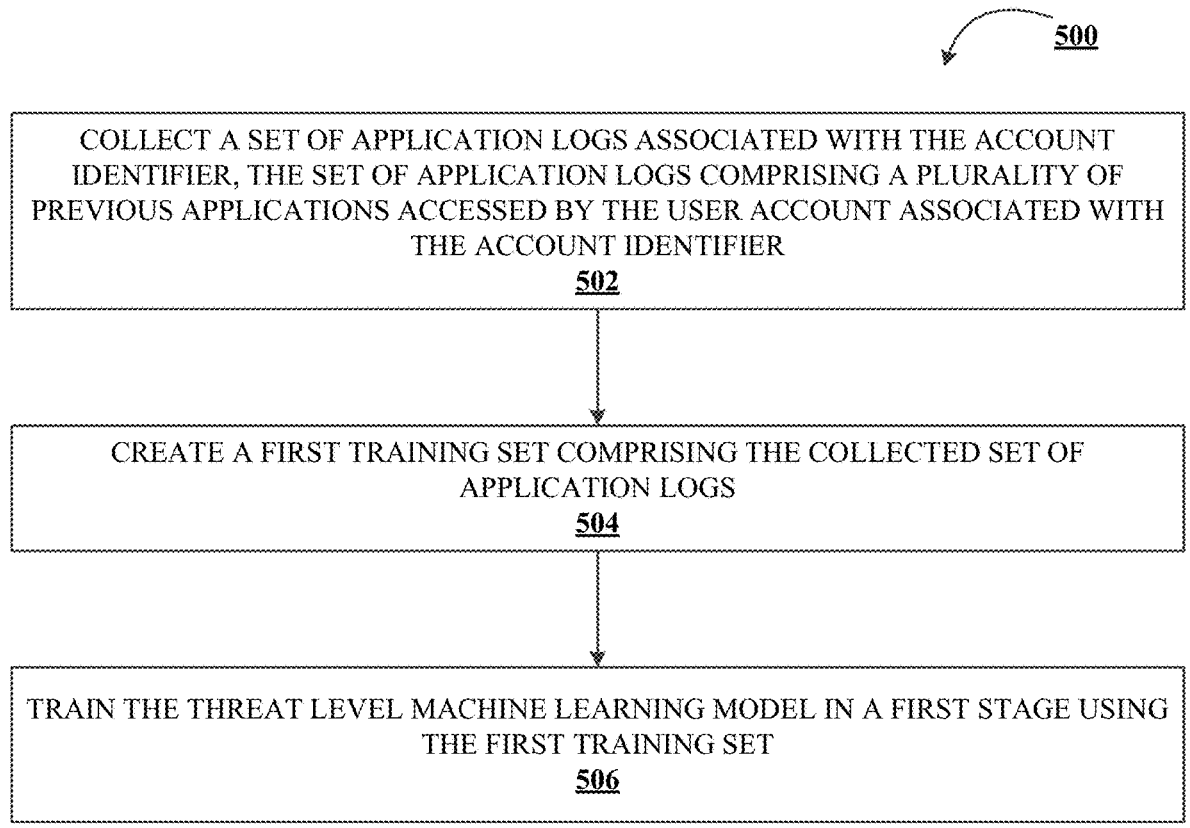

Having thus described embodiments of the invention in general terms, reference will now be made the accompanying drawings, wherein:

FIGS. 1A-1C illustrates technical components of an exemplary distributed computing environment for identifying unauthorized use of a user's authentication credentials to an electronic network based on non-public data access, in accordance with an embodiment of the invention;

FIG. 2 illustrates an exemplary machine learning model (ML) subsystem architecture, in accordance with an embodiment of the invention;

FIG. 3 illustrates a process flow for identifying unauthorized use of a user's authentication credentials to an electronic network based on non-public data access, in accordance with an embodiment of the invention;

FIG. 4 illustrates a process flow for determining a threat level indication of the user account and the associated effects of determining a high threat level of the user account, in accordance with an embodiment of the invention; and FIG. 5 illustrates a process flow for training a threat level machine learning model, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, an "account identifier" may generally refer to one or more data elements by which an account associated with the entity and/or authentication credential verification system may be uniquely identified. The account identifier may include, without limitation, a name, an email address, a phone number, a bank account number, a social security number, and/or the like. The account identifier may include, for example, one or more of Internet Protocol (IP) addresses associated with the user's device, numerical characters, alphabetical characters, alphanumeric codes, American Standard Code for Information Interchange (ASCII) characters, identification certificates, the like, or combinations thereof. An account identifier may be associated with a user account data object within an authentication credential verification system. For example, an account identifier may be used to associate one or more bank accounts with a particular user, wherein the verified user (e.g., original user that set up the account) is referred herein as the "real user" and/or the "verified user," and a third party user that is not the verified user is referred to as an "unverified user."

As described in further detail herein, the present invention provides a solution to the above-referenced problems in the field of technology by generating a secure, accurate, and efficient verification process for authentication credentials used to access non-public data associated with a user account. The present invention solves this technical problem by implementing an authentication verification system, like that shown as system 130 in FIGS. 1A-1C. For instance, the authentication credentials verification system acts to verify each and every access attempt by a real user (i.e., a verified access attempt) and each and every access attempt by a third party and/or unverified user (i.e., an unverified access attempt), and whether each access attempt comprises an accessing of non-public data which could be detrimental if accessed by a bad actor. However, it is also important to identify unverified users that are trusted parties of the verified user and whether the user account attempted access by the unverified user does not comprise non-public data, which may cause a lack of efficiency if a system were to automatically block each and every instance of a third party accessing a user account. For instance, and where the unverified user is trusted by the real user and there may be no detrimental effects if the unverified user accesses the user account, because there is no non-public data to be accessed, it may be detrimental to automatically block all access attempts as a blanket solution as it may cause time and delay in manually allowing access for each of these instances. Thus, there exists a need for a system, such as the authentication verification system, to determine such instances where non-public data may be accessed and where the accessor is not the real user of the account, such that the system may determine—itself—whether to allow access without manual interference by a manager of the user account, which could cause unnecessary delay and unnecessary computing resources to be used in transmitting data between the authentication credentials verification system and a plurality of devices for the manager of the user account in authenticating each access attempt.

Accordingly, the authentication verification system works by receiving a verified access attempt at a first time for a user account; receiving an unverified access attempt at a second time for the user account; determining the unverified access attempt is a credential sharing event for the user account, wherein the credential sharing event comprises a sharing of user credentials associated with the user account to an unverified user; determining the user account is an internal account; determining an unverified user associated with the unverified access attempt is an external user; receiving unverified account access logs associated with the unverified access attempt, the unverified account access logs comprising access to non-public data; and generating a unverified data access interface component to configure a graphical user interface of a device associated with a manager of the system.

What is more, the present invention provides a technical solution to a technical problem. As described herein, the technical problem includes the verification of authentication credentials which may have been shared, either intentionally or unintentionally, and where the user account that a third party (i.e., an unverified user) is attempting access has access to non-public data which may be detrimental if accessed by the third party. The technical solution presented herein allows for training a threat level machine learning model to determine a threat level of the user account (based on the ability of the user account to access non-public data and the type of public data that may be accessed) and whether a user attempting access is attempting access as an internal user or an external user of a manager/client of the system or of the user account, itself. In particular, the authentication credential verification system is an improvement over existing solutions to the verification of authentication credentials for specific user accounts and their associated data, (i) with fewer steps to achieve the solution, thus reducing the amount of computing resources, such as processing resources, storage resources, network resources, and/or the like, that are being used to verify each individual access attempt as they are received and verified separately; (ii) providing a more accurate solution to problem, thus reducing the number of resources required to remedy any errors made due to a less accurate solution, such as those generated by human error or computing error as data regarding each access attempt and associated data of the user account(s) is shared between multiple computing resources before the access attempt is allowed or denied; (iii) removing manual input and waste from the implementation of the solution, thus improving speed and efficiency of the process and conserving computing resources; (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for identifying unauthorized use of a user's authentication credentials to an electronic network based on non-public data access 100, in accordance with an embodiment of the invention. As shown in FIG. 1A, the distributed computing environment 100 contemplated herein may include a system 130 (i.e., an authentication credential verification), an end-point device (s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation. The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200 (e.g., a threat level machine learning model subsystem architecture), in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1, C\_2 \ldots C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1, C\_2 \ldots C\_n$ 238) live data 234 based on how similar they are to one another to solve exploratory challenges where little is known about the data, provide a description or label (e.g., $C\_1, C\_2 \ldots C\_n$ 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow 300 for identifying unauthorized use of a user's authentication credentials to an electronic network based on non-public data access, in accordance with an embodiment of the invention. In some embodiments, a system (e.g., similar to one or more of the systems described herein with respect to FIGS. 1A-1C and 2) may perform one or more of the steps of process flow 300. For example, an authentication credential verification system (e.g., the system 130 described herein with respect to FIGS. 1A-1C) may perform the steps of process flow 300.

As shown in block 302, the process flow 300 may include the step of receiving a verified access attempt at a first time for a user account. In some embodiments, the authentication credential verification system may receive a verified access attempt from a user device associated with a user account of the verified access attempt. For instance, the verified access attempt may comprise an access attempt of the user account which may be verified by the authentication credential verification system as an access attempt submitted by the real user associated with the user account. In some embodiments, such a verification of the access attempt may comprise tracking of the geolocation of the access attempt (e.g., where the geolocation of the access attempt at the first time matches previous access attempts by the real user, such as the real user's home address), tracking of the user's device and/or IP address (e.g., the real user's device, the real user's IP address), and/or the like.

As shown in block 304, the process flow 300 may include the step of receiving an unverified access attempt at a second time for the user account. By way of non-limiting example, the authentication credential verification system may receive an unverified access attempt for the user account, at a second time (i.e., a time later than the first time). In some embodiments, the authentication credential verification system may determine the access attempt is unverified based on a determination of a credential sharing of the authentication credentials for the user account.

For instance, and as described in the co-filed application titled, "Systems, Methods, And Apparatuses For Verifying Authentication Credentials In An Electronic Network," a credential sharing of the authentication credentials for the user account may be determined based on a plurality of factors, which may comprise geo-location tracking, IP address tracking, time-of-day of access attempts tracking, and/or the like. Such a determination that the access attempt is unverified may comprise a determination that the real user associated with the verified access attempt shared their authentication credentials (e.g., willingly to trusted third parties or unwillingly in a misappropriated manner). In some embodiments, the authentication credential verification system may determine the authentication credentials were shared where a geolocation of the first access attempt (e.g., the verified access attempt) and the second access attempt (i.e., the access attempt which may be determined to be the unverified access attempt) are at geolocations too far apart to have been done by the same person, such as the verified user. In some embodiments, the authentication credential verification system may determine an unverified access attempt by determining whether the geolocation of the second access attempt is different from previous access attempts, such as an access attempt that is not at the real user's residential address, work address, and/or other addresses tracked by the authentication credential verification system as typical for access attempts by the real user. In some embodiments, the authentication credential verification system may determine the unverified access attempt based on a determination that the second access attempt is occurring from a different user device than the user device associated with the real user. Further embodiments for credential sharing determination may described in further detail with respect to the application titled, "Systems, Methods, And Apparatuses For Verifying Authentication Credentials In An Electronic Network" which is incorporated by reference in its entirety, and has been filed on the same day as this application.

As shown in block 306, the process flow 300 may include the step of determining the unverified access attempt is a credential sharing event for the user account, wherein the credential sharing event comprises a sharing of user credentials associated with the user account to an unverified user. By way of non-limiting example, the authentication credential verification system may determine the unverified access attempt is a credential sharing event where the unverified access attempt is an access attempt that is not made by the real user for the user account. In some embodiments, the credential sharing event may comprise a sharing of the user credentials (e.g., authentication credentials) of the user account to an unverified user (i.e., not the real user associated with the user account). In some embodiments, and where the user account has multiple real users, the authentication credential verification system may determine that none of the real users of the user account are attempting access of the user account at the second time.

As shown in block 308, the process flow 300 may include the step of determining the user account is an internal account. In some embodiments, the authentication credential verification system may determine the user account associated with both the verified access attempt and the unverified access attempt is an internal account. For instance, an internal account may refer to an account that is associated with the manager of the authentication credential verification system, such as an internal account to the entity of the manager of the account. In some embodiments, such an internal account may be an employee account of the manager of the authentication credential verification system, a member of the manager of the authentication credential verification system, and/or the like. By way of non-limiting example, the authentication credential verification system may determine the user account is an internal account based on a user account identifier that uniquely identifies the user account and which may be saved in a database of the authentication credential verification system along with data identifying the user account as an internal account.

In some embodiments, such an internal account may comprise access to non-public data such as personally identifying information of a plurality of users, such as social security numbers, home or work addresses, phone numbers, full legal names, parents' full legal names, and/or the like.

As shown in block 310, the process flow 300 may include the step of determining an unverified user associated with the unverified access attempt is an external user. In some embodiments, the authentication credential verification system may determine the unverified user associated with the second access attempt (i.e., the unverified access attempt) is associated with an external user, such as a user external to the manager and/or client of the authentication credential verification system. For instance, an external user may be a user that is not a part of a client's entity (e.g., such as a company) that uses the services provided by the authentication credential verification system, where the external user is not an employee, employer, and/or in any way associated with the client's entity beyond attempting access of the internal account. In some embodiments, the external user may be a user that is not part of the authentication credential verification system itself (e.g., such as a manager of the authentication credential verification system), where the external user is not an employee, employer, and/or in any way associated with the authentication credential verification system beyond attempting access of the internal account.

In some embodiments, the external user associated with the unverified access attempt is a user associated with the manager of the authentication credential verification system. For instance, and in some embodiments, the external user may be associated with the authentication credential verification system itself (e.g., associated with a manger of the authentication credential verification system) or associated with a client of the system, but may not be associated with the internal account, such that the unverified access attempt is external to the internal account but is still associated with the manager of the system. In some embodiments, such an external user may be another employer, employee, user, and/or the like of the authentication credential verification system and may be associated with another user account (e.g., a secondary user account) of the authentication credential verification system that is not the user account of the unverified access attempt. In some embodiments, such an external user may be another employer, employee, user, and/or the like of the client entity using the authentication credential verification system and may be associated with another user account (e.g., a secondary user account) of the client entity using the authentication credential verification system, but which may not be associated with the user account of the unverified access attempt.

As shown in block 312, the process flow 300 may include the step of receiving unverified account access logs associated with the unverified access attempt, the unverified account access logs comprising access to non-public data. By way of non-limiting example, the authentication credential verification system may receive a plurality of unverified account access logs associated with the unverified access attempt, where the unverified account access logs may comprise the data regarding what data and/or applications the unverified user may have accessed while logged into the user account. In some embodiments, the unverified account access logs may comprise data showing the unverified user accessed certain applications and/or data that the user account has access to. In some embodiments, the unverified account access logs may comprise data showing whether the unverified user accessed any non-public data during the unverified access attempt.

As shown in block 314, the process flow 300 may include the step of generating an unverified data access interface component to configure a graphical user interface of a device associated with the manager of the system. In some embodiments, the authentication credential verification system may generate the unverified data access interface component based on data of the unverified account access logs to show the manager of the authentication credential verification system whether the unverified user accessed non-public data during the unverified access attempt. By way of non-limiting example, the unverified account access logs may be used to generate the unverified data access interface component, and the unverified data access interface component may be used to configure a graphical user interface of a user device by the authentication credential verification system transmitting the unverified data access interface component to configure the user device. In some embodiments, the user device the unverified data access interface component may be transmitted to may be a manager of the authentication credential verification system and/or may be a user device associated with a client of the authentication credential verification system.

In some embodiments, a manager of the authentication credential verification system may comprise a specific entity of the system such as a human resources team, a security team, an information technology (IT) team, and/or the like. In some embodiments, a user device of the client of the authentication credential verification system may comprise a user device associated with a human resources team of the client, a security team of the client, an information technology (IT) team of the client, and/or the like.

In some embodiments, the authentication credential verification system may generate a credential sharing indication interface component to show a manager of the authentication credential verification system and/or a client of the authentication credential verification system whether a credential sharing event has occurred. In some embodiments, the credential sharing indication interface component may comprise data regarding the user account that the credential sharing event occurred on, a timestamp of the credential sharing event (e.g., a timestamp of the unverified access attempt), data regarding the unverified user and/or external user, or data regarding the unverified account access logs. In some embodiments, the credential sharing indication interface component may be generated in response to a determination that the external user is a user associated with the manager of the authentication credential verification system and/or a client entity of the authentication credential verification system and the internal account is an account associated with the internal user associated with the manager of the authentication credential verification system or a client entity of the authentication credential verification system.

FIG. 4 illustrates a process flow 400 for determining a threat level indication of the user account and the associated effects of determining a high threat level of the user account, in accordance with an embodiment of the invention. In some embodiments, a system (e.g., similar to one or more of the systems described herein with respect to FIGS. 1A-1C and 2) may perform one or more of the steps of process flow 400. For example, an authentication credential verification system (e.g., the system 130 described herein with respect to FIGS. 1A-1C) may perform the steps of process flow 400.

As shown in block 402, the process flow 400 may include the step of applying a threat level machine learning model to a user account identifier associated with the user account. In some embodiments, the authentication credential verification system may apply a threat level machine learning model (e.g., like that described in FIG. 2 as model 200) to determine a threat level indication of the user account based on a determination that the user account has access to non-public data that could be detrimental if accessed by an unverified user. In some embodiments, the authentication credential verification system may determine whether the user account has access to non-public data (e.g., personal identifiable information), data that could be detrimental if accessed by an unverified use, by applying a trained threat level machine learning model to a user account identifier associated with the user account of the unverified access attempt.

In some embodiments, the threat level machine learning model may determine the user account has a threat level indication of at least one of high threat level, a medium threat level, and/or a low threat level. By way of non-limiting example, the high threat level may be determined where the user account has access to multiple personally identifiable information (e.g., within the user account itself and/or within other applications or accounts the user account has access to), and where the personally identifiable information would be detrimental if accessed by a single user that is not the real user. For instance, a user account that has access to a person's social security number and other personally identifiable information such as a person's home address, parents' legal names (including maiden names), and/or the like, which may be used to misappropriate a person's identity, may be used by the threat level machine learning model to determine the user account is of a high threat level. In some embodiments, the threat level machine learning model may be trained to determine a high threat level where a user account has access to a social security number of a plurality of people, without any other personally identifiable information being needed to be identified by the threat level machine learning model as a high threat level.

In some embodiments, the threat level machine learning model may determine the user account is a medium threat level where the non-public information is only slightly detrimental if accessed by an unverified user. For instance, such a medium threat level may be determined by the threat level machine learning model where the user account has access to data regarding a person's full legal name, phone number, email address, home address, parents' legal names, and/or the like. Such information may be personal and the person for which the information belongs to may wish the information to remain secure, but the information may not be of a type where the misappropriation may lead to as detrimental effects as accessing the person's social security number.

In some embodiments, the threat level machine learning model may determine the user account is a low threat level where the user account does not have access to any non-public data (e.g., either within other applications the user account has access to and/or the user account itself).

In some embodiments, the threat level machine learning model may determine the threat levels based on a plurality of thresholds, and where the threat level machine learning model may output a threat number which may be used to determine whether the threat number reaches a certain threshold to determine the threat level. For instance, the threat number not reaching either one of a low threshold or a medium threshold may be used to determine that the threat level is a low threat level. By way of non-limiting example, the threat level meeting a low threshold, but not a medium threshold, may be used to determine the threat level is a medium threat level. By way of non-limiting example, where the threat number reaches both a low threshold and a medium threshold, the threat level may be determined to a high threat level. In some embodiments, the threat level machine learning model and/or the authentication credential verification system itself, may be trained and/or pre-programmed with the threshold numbers for the determination of the threat levels. In this manner, the threat level machine learning model may be universally used by different client entities, but the threat level machine learning model may be trained to for client-specified threat levels and threshold amounts.

As shown in block 404, the process flow 400 may include the step of determining, by the threat level machine learning model, a threat level indication of the user account, wherein the threat level indication comprises a high threat level where the user account has access to a non-public data. By way of non-limiting example, the authentication credential verification system may determine a threat level of the user account as a high threat level where the user account has access to a plurality of non-public data, which may be accessed within a plurality of applications the user account has access to and/or accessed within the user account data itself.

In some embodiments, and where the non-public data requires another set of authentication credentials to access the non-public data (e.g., which are different from the authentication credentials used for the user account in the unverified access attempt), the authentication credential verification system may—through the threat level machine learning model—determine the threat level to be medium as the unverified user may have more difficulty accessing the non-public data. However, and in some other embodiments, and where the non-public data requires another set of authentication credentials to access the non-public data, the authentication credential verification system—through the threat level machine learning model—may determine the threat level to still be a high threat level due to the types of non-public data that may be accessed with the separate authentication credentials.

In some embodiments, and as shown in block 406, the process flow 400 may include the step of automatically denying, in response to determining the high threat level indication of the user account, the unverified access attempt to the account. By way of non-limiting example, the authentication credential verification system may automatically deny any access to the user account once the user account has been determined to be of a high threat level and once the unverified access attempt has been received. In some embodiments, and where the unverified access attempt has already begun (e.g., the unverified user has already gained access to the user account), the authentication credential verification system may automatically halt the accessing of the user account by the unverified user any further, such that the denial is automatic and takes place for any future access attempts by the unverified user.

In some embodiments, the authentication credential verification system may store data of the unverified user in its database (e.g., memory 104 and/or memory 154), such as data regarding the unverified user's device (e.g., device identifier), IP address, geolocation, and/or the like.

In some embodiments, and where the threat level machine learning model has determined the user account to be of a medium threat level, the authentication credential verification system may automatically deny the unverified access attempt to the user account. Such a denial may be based on a potential of the unverified user accessing non-public data, no matter the severity. In some embodiments, and where the unverified access attempt has already started when the threat level machine learning model determines the user account to be of a medium threat level, the authentication credential verification system may deny any further accessing of the user account by the unverified user. In some embodiments, and where the user account is determined to be a medium threat level, the authentication credential verification system may allow the unverified access attempt, such as in the embodiment where the authentication credential verification system has determined that the unverified access attempt occurred by a trusted third party of the real user (e.g., a family member, a trusted friend, a trusted employee, and/or the like). Such trusted third parties, and the determination of whether the unverified user is a trusted third party, are discussed in further detail with respect to the application titled, "Systems, Methods, And Apparatuses For Verifying Authentication Credentials In An Electronic Network," which filed herewith and is incorporated by reference in its entirety.

In some embodiments, and where the threat level machine learning model determines the user account to be of a low threat level, the authentication credential verification system may allow access to the user account by the unverified user. By way of non-limiting example, the authentication credential verification system may allow access where the threat level is a low threat level, where the unverified user has been determined to be a trusted third party to the user of the user account and where the authentication credential verification system has determined that the authentication credentials were intentionally shared with the unverified user (e.g., rather than misappropriated by the unverified user such as through hacking, overhearing, and/or the like).

In some embodiments, and as shown in block 408, the process flow 400 may include the step of generating, in response to determining the high threat level indication of the user account, a high threat level interface component to configure a graphical user interface of a device associated with the manager of the system. By way of non-limiting example, and where the threat level machine learning model has determined the user account to be a high threat level, a high threat level interface component may be generated by the system and transmitted to a user device associated with a manager of the authentication credential verification system (e.g., a user device associated with a human resources team, a security team, an information technology team, and/or the like of the authentication credential verification system and/or of a client entity using the authentication credential verification system). Such a high threat level interface component may comprise at least one of data of the user account attempted access by the unverified user, a timestamp of the unverified access attempt, data regarding the unverified account access logs (e.g., where the unverified user gained access to the user account, if even for a short time until the access was halted), the non-public data that may be accessed by the user account and the non-public data used by the threat level machine learning model to determine a high threat level, and/or the like.

In some embodiments, the high threat level interface component may be transmitted from the authentication credential verification system to a user device associated with the real user of the user account, such as over a network (e.g., network 110). In this manner, the authentication credential verification system may indicate to the real user of the user account that an unverified access attempt has occurred on the user account and may request the real user to complete a variety of tasks. In some embodiments, the variety of tasks may comprise at least one of requesting the user to input new authentication credentials for the user account (i.e., change the authentication credentials for the user account), indicate an allowance or denial of the unverified access attempt (e.g., where the real user may wish the unverified access attempt to occur because the unverified user is a trusted third party), contact the manager of the authentication credential verification system and/or the client entity using the authentication credential verification system that the real user is associated with, and/or the like. In some embodiments, the authentication credential verification system itself may automatically transmit an indication and/or an interface component to the manager of the authentication credential verification system and/or a client entity of the authentication credential verification system indicating that the unverified access attempt has occurred, without the real user's interference and/or approval.

FIG. 5 illustrates a process flow 500 for training a threat level machine learning model, in accordance with an embodiment of the invention. In some embodiments, a system (e.g., similar to one or more of the systems described herein with respect to FIGS. 1A-1C and 2) may perform one or more of the steps of process flow 500. For example, an authentication credential verification system (e.g., the system 130 described herein with respect to FIGS. 1A-1C) may perform the steps of process flow 500.

As shown in block 502, the process flow 500 may include the step of collecting a set of application logs associated with the account identifier, the set of application logs comprising a plurality of previous applications accessed by the user account associated with the account identifier. By way of non-limiting example, the authentication credential verification system may collect a set of application logs associated with the account identifier, where the set of application logs comprise data regarding previous applications accessed by the user account and the associated data that may be accessed at each application (e.g., such as non-public data that may be accessed at each application). In some embodiments, the set of application logs do not need to comprise actual accessing of the non-public data but may only need to show that the non-public data of each application could be accessed by the user account. In some embodiments, the set of application logs may further comprise any data that may be accessed by the user account itself (e.g., the data that could be accessed within the user account without the need to access a separate application, where the user account may comprise non-public data).

As shown in block 504, the process flow 500 may include the step of creating a first training set comprising the collected set of application logs. By way of non-limiting example, the authentication credential verification system may create a first training set comprising the collected set of application logs for the user account. In some embodiments, the set of application logs for the user account may comprise multiple sets of application logs, collected at different times (e.g., at a plurality of times) where the authentication credential verification system may use the multiple sets of application logs collected at various times to generate multiple training sets for the training of the threat level machine learning model. In this manner, the threat level machine learning model may be continuously trained by a plurality of training sets, with the training sets comprising sets of application logs collected at different times.

As shown in block 506, the process flow 500 may include the step of training the threat level machine learning model in a first stage using the first training set. In some embodiments, the authentication credential verification system may train the threat level machine learning model in a first stage using the first training set by inputting the first training set to the threat level machine learning model. In some embodiments, the authentication credential verification system may further train the threat level machine learning model by continuously inputting multiple training sets comprising multiple sets of application logs for the associated user account. In this manner, the threat level machine learning model may be used to determine a likelihood of a threat for the user account based on the non-public data that may be accessed within the user account (e.g., by way of accessing application associated with the user account and/or by way of accessing data of the user account itself). By way of non-limiting example, the threat level machine learning model may be trained to output a threat level of the user account (e.g., high threat level, medium threat level, and/or low threat level) based on the data of the set of application logs.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
| --- | --- | --- |
| 17/944,716 | SYSTEMS, METHODS, AND APPARATUSES FOR VERIFYING AUTHENTICATION CREDENTIALS IN AN ELECTRONIC NETWORK | Concurrently herewith |

What is claimed is:

1. A system for identifying unauthorized use of a user's authentication credentials, the system comprising:
   a memory device comprising non-transitory computer-readable medium with computer-readable program code stored thereon;
   at least one processing device operatively coupled to the at least one memory device and at least one communication device, wherein when executed the computer-readable code is configured to cause the at least one processing device to:
   receive a verified access attempt at a first time for a user account;
   receive an unverified access attempt at a second time for the user account;
   determine the unverified access attempt is a credential sharing event for the user account, wherein the credential sharing event comprises a sharing of user credentials associated with the user account to an unverified user;
   determine the user account is an internal account;
   determine an unverified user associated with the unverified access attempt is an external user;
   receive unverified account access logs associated with the unverified access attempt, the unverified account access logs comprising access to non-public data; and
   generate an unverified data access interface component to configure a graphical user interface of a device associated with a manager of the system.

2. The system of claim 1, wherein when executed, the computer-readable code is further configured to cause the at least one processing device to:
   apply a threat level machine learning model to a user account identifier associated with the user account; and
   determine, by the threat level machine learning model, a threat level indication of the user account, wherein the threat level indication comprises a high threat level where the user account has access to a non-public data.

3. The system of claim 2, wherein when executed, the computer-readable code is further configured to cause the at least one processing device to:
   automatically deny, in response to determining the high threat level indication of the user account, the unverified access attempt to the account.

4. The system of claim 2, wherein when executed, the computer-readable code is further configured to cause the at least one processing device to:
   generate, in response to determining the high threat level indication of the user account, a high threat level interface component to configure a graphical user interface of a device associated with the manager of the system.

5. The system of claim 2, wherein when executed, the computer-readable code is further configured to cause the at least one processing device to:
   collect a set of application logs associated with the user account identifier, the set of application logs comprising a plurality of previous applications accessed by the user account associated with the user account identifier;
   create a first training set comprising the collected set of application logs; and
   train the threat level machine learning model in a first stage using the first training set.

6. The system of claim 5, wherein the collected set of application logs comprises non-public data.

7. The system of claim 1, wherein the internal account is an account associated with an internal user associated with the manager of the system.

8. The system of claim 7, wherein when executed, the computer-readable code is further configured to cause the at least one processing device to:
   generate, wherein the external user is a user associated with the manager of the system and the internal account is an account associated with the internal user associated with the manager of the system, a credential sharing indication interface component to configure the graphical user interface of the device associated with the manager of the system.

9. The system of claim 1, wherein the external user associated with the unverified access attempt is a user that is not associated with the manager of the system.

10. The system of claim 1, wherein the external user associated with the unverified access attempt is a user associated with the manager of the system.

11. The system of claim 1, wherein the second time associated with the unverified access attempt is at a later time than the first access attempt associated with the verified access attempt.

12. A computer program product for identifying unauthorized use of a user's authentication credentials, wherein the computer program product comprises at least one non-transitory computer-readable medium having computer-readable program code portions embodied therein, the computer-readable program code portions which when executed by a processing device are configured to cause the processing device to:

receive a verified access attempt at a first time for a user account;

receive an unverified access attempt at a second time for the user account;

determine the unverified access attempt is a credential sharing event for the user account, wherein the credential sharing event comprises a sharing of user credentials associated with the user account to an unverified user;

determine the user account is an internal account;

determine an unverified user associated with the unverified access attempt is an external user;

receive unverified account access logs associated with the unverified access attempt, the unverified account access logs comprising access to non-public data; and generate a unverified data access interface component to configure a graphical user interface of a device associated with a manager of a system.

13. The computer program product of claim 12, wherein the computer-readable program code portions which when executed by the processing device are further configured to cause the processing device processing device to:

apply a threat level machine learning model to a user account identifier associated with the user account; and determine, by the threat level machine learning model, a threat level indication of the user account, wherein the threat level indication comprises a high threat level where the user account has access to a non-public data.

14. The computer program product of claim 13, wherein the computer-readable program code portions which when executed by the processing device are further configured to cause the processing device to:

automatically deny, in response to determining the high threat level indication of the user account, the unverified access attempt to the account.

15. The computer program product of claim 13, wherein the computer-readable program code portions which when executed by the processing device are further configured to cause the processing device to:

generate, in response to determining the high threat level indication of the user account, a high threat level interface component to configure a graphical user interface of a device associated with the manager of the system.

16. The computer program product of claim 12, wherein the internal account is an account associated with an internal user associated with the manager of the system.

17. The computer program product of claim 12, wherein the external user associated with the unverified access attempt is a user that is not associated with the manager of the system.

18. The computer program product of claim 12, wherein the external user associated with the unverified access attempt is a user associated with the manager of the system.

19. The computer program product of claim 16, wherein the computer-readable program code portions which when executed by the processing device are further configured to cause the processing device to:

generate, wherein the external user is a user associated with the manager of the system and the internal account is an account associated with the internal user associated with the manager of the system, a credential sharing indication interface component to configure the graphical user interface of the device associated with the manager of the system.

20. A computer-implemented method for identifying unauthorized use of a user's authentication credentials, the computer-implemented method comprising:

receiving a verified access attempt at a first time for a user account;

receiving an unverified access attempt at a second time for the user account;

determining the unverified access attempt is a credential sharing event for the user account, wherein the credential sharing event comprises a sharing of user credentials associated with the user account to an unverified user;

determining the user account is an internal account;

determining an unverified user associated with the unverified access attempt is an external user;

receiving unverified account access logs associated with the unverified access attempt, the unverified account access logs comprising access to non-public data; and generating a unverified data access interface component to configure a graphical user interface of a device associated with a manager of a system.

* * * * *